United States Patent [19]

Pawlowski

[11] Patent Number: 5,432,382
[45] Date of Patent: Jul. 11, 1995

[54] PERMANENT MAGNET ENERGY STORAGE APPARATUS

[76] Inventor: Mark Pawlowski, 7456 West Rosedale, Chicago, Ill. 60631

[21] Appl. No.: 220,370

[22] Filed: Mar. 29, 1994

[51] Int. Cl.$^6$ .................................................. H02K 7/06
[52] U.S. Cl. ...................................... 290/1 R; 310/15; 310/20; 318/135
[58] Field of Search ................ 290/1 R, 1 E; 310/15, 310/20, 74; 318/135; 335/229, 230

[56] References Cited

U.S. PATENT DOCUMENTS

| | | | |
|---|---|---|---|
| 243,765 | 7/1881 | Farmer | 310/20 |
| 431,492 | 7/1890 | Van Depoele | 310/20 |
| 431,493 | 7/1890 | Van Depoele | 310/20 |
| 3,541,362 | 11/1970 | Pouit | 310/15 |
| 3,675,113 | 7/1972 | Bader et al. | 322/28 |
| 3,743,870 | 7/1973 | Hunt | 310/13 |
| 4,055,789 | 10/1977 | Lasater | 320/6 |
| 4,128,020 | 12/1978 | Gray | 74/572 |
| 4,260,914 | 4/1981 | Hertrich | 310/27 |
| 4,353,426 | 10/1982 | Ward | 310/15 |
| 4,486,667 | 12/1984 | Srogi | 290/1 R |
| 5,036,930 | 8/1991 | Bisel et al. | 180/65.1 |
| 5,170,104 | 12/1992 | Laughlin | 318/135 |
| 5,219,034 | 6/1993 | Wortham | 180/65.3 |

Primary Examiner—Todd DeBoer
Assistant Examiner—Robert Lloyd Hoover
Attorney, Agent, or Firm—Tilton Fallon Lungmus

[57] ABSTRACT

An energy storage apparatus is disclosed in which a plurality of permanent magnets are used to store kinetic energy. The apparatus includes first and second fixed magnets which are positioned a distance apart along a longitudinal axis with both magnets having a like magnetic pole facing the distance between the magnets. A third moveable magnet is mounted on a guide rod which allows movement of the third magnet between a charged position in which the magnet's like pole is proximal the one fixed magnet and an uncharged position in which the opposite pole is adjacent the other fixed magnet. In the charged position, the magnetic fields of the adjacent like poles of the moveable magnet and the fixed magnet create a strong repelling force which urges the third magnet towards the uncharged position and the attraction forces created by the opposite poles of a moveable magnet and the other fixed magnet also draws the moveable magnet towards the uncharged position. A locking mechanism is provided for locking the third magnet in the charged position and allowing selective release. A power transmission mechanism is provided for receiving the energy to be stored and to move the third magnet from the uncharged position to the charged position. When the moveable magnet is released from the charged position, the power transmission mechanism also harnesses the kinetic energy from the moveable magnet as it moves from the charged position to the uncharged position and transmits such energy to a load.

20 Claims, 1 Drawing Sheet

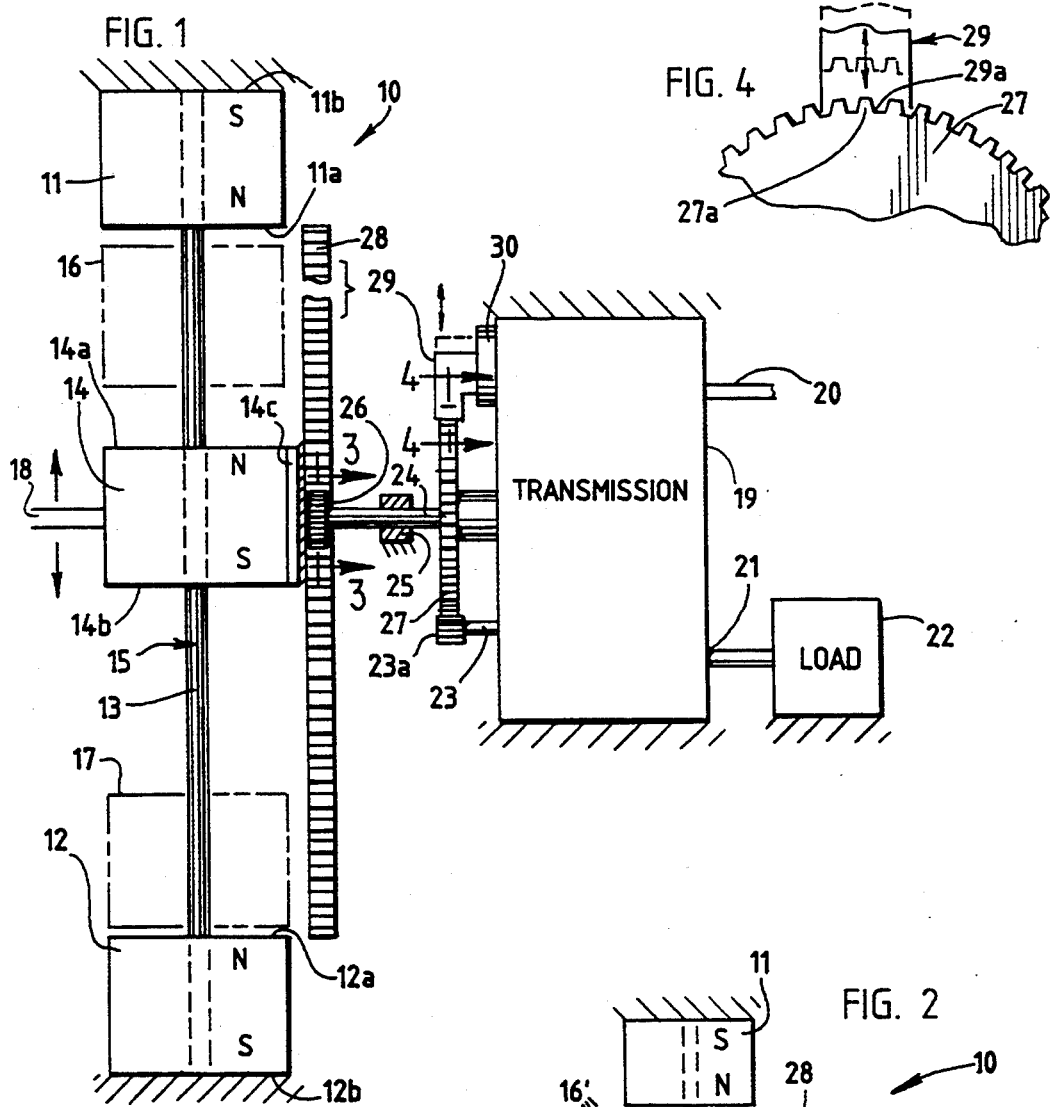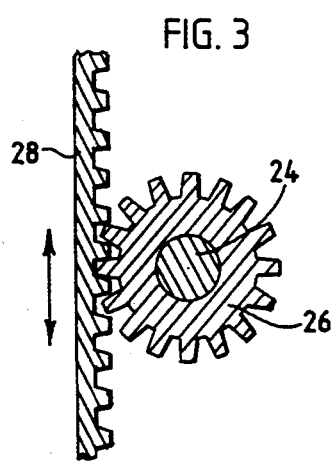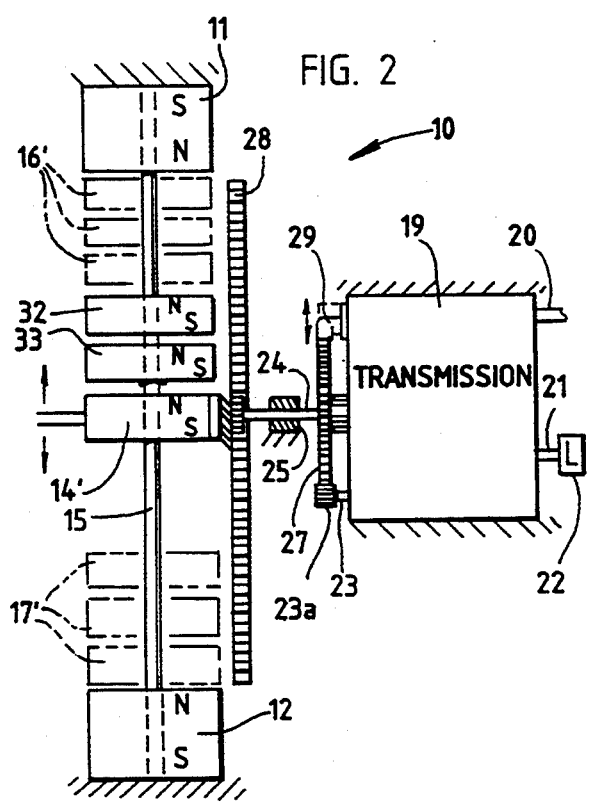

PERMANENT MAGNET ENERGY STORAGE APPARATUS

BACKGROUND AND SUMMARY

Ever increasing expenses for energy sources have made energy conservation an issue of increased importance in recent years. However, many current energy sources and their delivery systems require that excess energy be produced to meet high demand conditions with the surplus energy often being wasted. Accordingly, it is believed that means for harnessing such excess energy and storing it for later use is highly desirable.

Although excess energy is most often produced in power plants, excess or unused energy is often wasted in common devices such as automobiles. Examples of such excess energy may be found in flywheel rotation, rotation of the wheels when the vehicle stops or decelerates, or in various components of the drive train. Harnessing and storing such excess or unused energy in conventional vehicles would be beneficial, but it is believed that harnessing and storing such energy in solar or electrical powered vehicles would be highly desirable as such vehicles have not achieved widespread use yet due to their limited efficiency which could be greatly enhanced with a means for storing and harnessing excess or unused energy in the vehicle.

Perhaps the most common means for storing energy is a chemical battery. However, it is believed that chemical batteries are not the most efficient means for storing energy in that they require expensive chemicals, can be unduly bulky, may posses only a limited useful life, and may be dangerous in situations in which the integrity of the battery is compromised such as in an automobile accident. It is therefore believed that a mechanical means for storing excess energy would be greatly advantageous over prior chemical systems.

One type of mechanical energy storage apparatus is disclosed by Gray in U.S. Pat. No. 4,128,020. Essentially, this apparatus utilizes a flywheel having a plurality of flywheel magnets located about its periphery which interact with magnets placed around the circumference of the flywheel to enhance the rotary motion of the flywheel. While such an apparatus is able to store kinetic energy in the rotation of the flywheel, this device requires that the flywheel remain in motion during periods of energy storage which itself wastes energy and can be inconvenient or impractical for many applications.

An important aspect of this invention therefore lies in providing a mechanical energy storage apparatus that is highly effective and efficient and that is capable of storing energy without requiring continuous movement of parts during energy storage periods. Briefly, the present invention achieves such objectives by providing an energy storage apparatus which includes first and second permanent magnets which are fixed a distance apart along a common longitudinal axis. A third permanent magnet is movably positioned along the axis between the first and second magnets and a guide means maintains the third magnet in such a position. All three magnets have their magnetic fields aligned along the axis with the third magnet having a like pole facing one of the fixed magnets and an opposite pole facing the other fixed magnet. The guide means allows the third magnet to move between a charged position in which its like pole is proximal to the like pole of the one fixed magnet and an uncharged position in which the opposite pole is proximal the other fixed magnet. In the charged position, the like poles of the third magnet and the one fixed magnet create a powerful repelling force which urges the third magnet towards the other fixed magnet. In addition, the other fixed magnet which has an opposite pole facing the third magnet creates an attractive force which draws the third magnet towards the uncharged position. The fixed magnets and the longitudinal axis may additionally be orientated in a vertical direction with the charged position at the top of the guide pole so that gravity forces act to compliment the repelling and attracting forces which urge the moveable magnet from the charged position to the uncharged position at the bottom. A locking means is provided for securing the third magnet in the charged position and allowing selective release of that magnet when it is desired to harness the kinetic energy stored in the third magnet when it is in the charged position.

A power transmission means is provided which serves the dual functions of receiving energy from an input source to move the third magnet to the charged position and harnessing the kinetic energy from the third magnet when it is released from the charged position and moves towards the uncharged position. In one embodiment, the power transmission means may take the form of a mechanical lever secured to the third moveable magnet and manual or other power can be used to physically move the third magnet to the charged position. When the magnet is then released by the locking means, the lever attached to the moveable magnet may be used in a variety of applications such as driving nails or pins, firing a toy cap gun, or similar operations.

In another embodiment, the power transmission means may take the form of a transmission box having a rotary input and a rotary output. The input may be connected to any type of power source such as a windmill, excess rotary motion in a vehicle or power plant, a motor run by solar energy, etc. The output of the transmission box, which is powered by the moveable magnet, may then be connected to a generator or motor for producing electrical or mechanical energy for a variety of mechanical devices such as portable screwdrivers, children's toys, electric cars, mechanical cars, etc. The transmission box includes a drive means for transmitting energy to and from the moving third magnet. In one embodiment, the drive means may include a rack gear permanently fixed to the moveable magnet and a drive shaft having a pinion gear at one end which engages the rack gear and a power gear at the other end which engages a power shaft which drives the transmission box. The gear ratio selected for the transmission box will depend upon the particular application for which the energy storage apparatus is to be used, however, it is believed that in most applications the gear ratio of the transmission box should be capable of stepping down a high RPM input to a high torque output to move the third moveable magnet and stepping up the high torque output from the third moveable magnet, when it moves from the charged to uncharged position, to a high RPM output.

Where it is desirable to store high power energy, a plurality of power-enhancing magnets may be positioned on the longitudinal axis between the moveable third magnet and the one fixed magnet. Such power-enhancing magnets are positioned with their magnetic fields aligned along the axis and with their north and south poles facing the like poles of adjacent magnets to create constant repelling forces between the magnets. Such a construction requires a high powered torque to charge the system and will produce a high powered or high RPM output when that energy is released. In such a construction, the transmission box should be geared accordingly depending upon the particular application for which the energy storage apparatus of this invention is to be used, such as for high torque or high RPM output, etc.

Other objects, features and advantages of the invention will become apparent from the following disclosure of the drawings.

BRIEF DESCRIPTION OF THE DRAWINGS

FIG. 1 is a schematic view of the energy storage apparatus of the present invention.

FIG. 2 is a schematic view of another embodiment of the energy storage apparatus of this invention.

FIG. 3 is a schematic cross-sectional view taken along line 3—3 of FIG. 1.

FIG. 4 is a schematic side view illustrating one embodiment of the locking means of the present invention taken along line 4—4 of FIG. 1.

DETAILED DESCRIPTION OF PREFERRED EMBODIMENTS

In the drawings, the numeral 10 generally designates the permanent magnet energy storage apparatus of this invention. The device comprises first and second fixed permanent magnets 11 and 12 that are mounted a distance apart along a common longitudinal axis 13. Fixed magnets 11 and 12 have their magnetic fields aligned along axis 13 as shown by their respective north poles 11a and 12a and south poles 11b and 12b. In the illustration given, magnets 11 and 12 have their north poles facing each other, but it will be understood that the magnets could instead have their south poles facing each other as long as each magnet has a like pole facing the distance between the magnets. Magnets 11 and 12 are preferably of the well-known permanent magnet type which are commercially available.

A third permanent magnet 14 is positioned between fixed magnets 11 and 12 and is moveable therebetween. Third magnet 14 has its magnetic field aligned along axis 13 as shown by its north pole 14a and south pole 14b. In the illustration given in FIG. 1, north pole 14a faces north pole 11a of fixed magnet 11 and south pole 14b faces north pole 12a of fixed magnet 12. Such a configuration results in magnet 14 being repelled from the magnet having an adjacent like pole and attracted to the magnet having the adjacent opposite pole. It will be understood that third magnet 14 could be reversed so that south pole 14b faces magnet 11 and north pole 14a faces magnet 12 as long as third magnet 14 has a like pole facing one of the fixed magnets and has an opposite pole facing the other fixed magnet.

First and second fixed magnets 11 and 12 are fixed a distance apart such that the peripheral edges of their magnetic fields interact only to a small degree or, preferably, do not interact. However, fixed magnets 11 and 12 should be positioned close enough so that the magnetic field of magnet 14 always overlaps with at least one of the magnetic fields of the fixed magnets. In the preferred construction, fixed magnets 11 and 12 should be positioned so that, as magnet 14 leaves a point where its magnetic field interacts with the magnetic field of one end magnet, its magnetic field begins to interact with the other end magnet. Such a configuration results in the third moveable magnet being in a position where it is repelled from the one end magnet, a position where it is attracted to the other fixed magnet, or under the influence of both magnets in which case it is repelled from the one fixed magnet and attracted to the other fixed magnet. To enhance the repelling force between third magnet 14 and the one fixed magnet having an adjacent like pole (magnet 11 in FIG. 1), longitudinal axis 13 may be orientated vertically such that gravity acts in a direction parallel to and coincident with the axis so that the weight of moveable magnet 14 acts in addition to the repelling force of magnet 11 and the attraction force of magnet 12. In such an embodiment, it is believed that maximizing the weight of moveable magnet 14 would be advantageous to take full advantage of the forces of gravity, as long as the total energy storage capacity of the apparatus is not diminished.

A guide means is provided for positioning moveable magnet 14 along longitudinal axis 13 and between fixed magnets 11 and 12. In the illustration given in FIG. 1, the guide means takes the form of a cylindrical guide rod 15 that passes through the center of each of the first, second and third magnets. However, it will be noted that other guide means may be used such as a longitudinal track that guides the outside edges of the magnets. One such alternative guide means may comprise connecting the outer edges of moveable magnet 14 to the power transmission means or any other guide means that allows magnet 14 to move in a stable fashion along longitudinal axis 13. In any event, guide rod 15 or any other guide means should be composed of a non-ferrous material so that it will not interfere with the operation of the device.

The guide means, shown as guide rod 15, allows third magnet 14 to move between a charged position 16, in which moveable magnet 14 has one of its poles proximal a like pole of one of the fixed end magnets to create a repelling force therebetween, and an uncharged position 17, in which moveable magnet 14 has one of its poles proximal to an opposite pole of the other fixed magnet to create attraction forces therebetween. In the illustration given, when in charged position 16, magnet 14 has its north pole 14a proximal to north pole 11a of fixed end magnet 11. In such a position, the respective magnetic fields of magnets 11 and 14 interact to create a powerful repelling force that urges magnet 14 towards uncharged position 17. As magnet 14 moves away from fixed magnet 11, the magnetic field at the south pole end of magnet 14 interacts with the opposite or north pole end of fixed magnet 12, creating an attraction force between the two magnets which also urges magnet 14 towards uncharged position 17.

A power transmission means is provided for receiving energy from an external source and moving magnet 14 from uncharged position 17 to charged position 16. The power transmission means also harnesses kinetic energy from magnet 14 when it is released from the charged position and moves to the uncharged position under the repelling and attraction forces between magnet 14 and fixed magnets 11 and 12. In one embodiment, the power transmission means may take the form of a mechanical lever 18 which acts as a handle for moving magnet 14. Lever 18 may be of the type that may be operated manually (i.e., by hand) to place magnet 14 in the charged position and lever 18 may then operate a desired mechanism when magnet 14 is released from the charged position. Utilizing such a lever as the power transmission means may be useful in small applications such as children's toys (i.e., cap guns or the like) or larger applications such as nail or pin driving devices. While such examples have been disclosed to illustrate the usefulness of this particular power transmission means, it will be understood that this invention and such a power transmission means may be used in a variety of applications.

In another embodiment, the power transmission means may take the form of a transmission box 19 having a rotary input shaft 20 and a rotary output shaft 21. Input shaft 20 may be connected to any rotary power source or drive train and the energy taken therefrom is used to move magnet 14 from the uncharged position to the charged position. Examples of energy sources that may be used to turn input shaft 20 may include windmill energy, excess energy produced at fossil fuel or solar energy power plants, mechanical energy taken from a power take-off in an automobile (including solar or electrical powered vehicles), or any other source from which energy is to be harnessed and stored by the apparatus of this invention. Output shaft 21 is driven when magnet 14 moves from the charged position to the uncharged position and may be connected to a load 22. Load 22 may take the form of a generator to produce electrical energy, a power train, or any other load for which it is desired to supply the stored energy. While examples have been given of sources of energy that may be used to power input 20 and the uses of the power output by output shaft 21, it will be understood that the present invention is not so limited and may be applied to many applications.

Transmission box 19 is connected to a drive means for translating the linear movement of magnet 14 along guide pole 15 into rotary movement which is transferred to the transmission box by power shaft 23 which has a pinion gear 23a. The drive means may take the form of a drive shaft 24 that is rotatably mounted in fixed mounting 25 and has a pinion gear 26 at one end and a power gear 27 at the other end. Power gear 27 engages pinion gear 23a on transmission box 19 which transmits the power through a selected gear arrangement, depending upon the particular application, from shaft 23 to input 20 or output 21. Pinion gear 26 at the other end of drive shaft 24 engages rack gear 28 which is permanently fixed to an edge 14c of moveable magnet 14. When magnet 14 moves, rack 28 moves in the linear direction and engages pinion gear 26 which rotates drive shaft 24 (FIG. 3). Drive shaft 24 in turn rotates power gear 27, gear 23a, and shaft 23, thereby translating the linear motion of magnet 14 to rotary motion in transmission box 19. It will be understood that the components that are in close proximity to the magnets of the energy storage system, such as rack 28, pinion gear 26, and drive shaft 24, are preferably made of non-ferrous materials (such as aluminum) so that they do not interfere with the operation of the apparatus. Depending upon the particular application for which the energy storage apparatus of this invention is to be used, transmission box 19 may include well-known gear setups and ratios which adequately convert the power or torque movement of magnet 14 to the desired output torque or speed required to run load 22.

A locking means is provided for releasably securing moveable magnet 14 in charged position 16 during periods of energy storage and allowing selected release of magnet 14 when it is desired to harness the energy of magnet 14 when it moves from charged position 16 to uncharged position 17. While it will be understood that many different setups may be utilized for locking magnet 14 in charged position 16, the embodiment given in the illustrations shows a slidable locking member 29 mounted upon a base 30 on transmission box 19. In such a construction, locking member 29 is moved from a position where it does not engage power gear 27 to a position in which its distal end 29a engages the gear teeth 27a of power gear 27 and stops its rotary movement as best illustrated in FIG. 4. Such a locking means may be powered by an electrical solenoid or other means which allows an operator to selectively engage or disengage locking member 29. While the locking means has been shown engaging a gear that is external of the transmission box, the locking means may be employed to engage any gear that is inside of the transmission box or located by the input shaft 20 or output shaft 21. In some circumstances, it may be preferable to have the locking means located as close to the load, the moveable magnet 14, as possible to reduce strain on the other parts of the system.

When it is desired to increase the power stored in moveable magnet 14 at its charged position, a plurality of power-enhancing magnets may be provided with their magnetic fields aligned along axis 13 between moveable magnet 14' and the one fixed magnet which has a like pole facing magnet 14'. In the illustration given in FIG. 2, power enhancing magnets 32 and 33 are provided on guide pole 15 between moveable magnet 14' and fixed end magnet 11. Power-enhancing magnets 32 and 33 have their magnetic fields aligned along axis 13 and have their north and south poles aligned so that such poles will always face like poles, creating repelling forces between each adjacent magnet. When the system is charged, magnets 14' 32 and 33 are moved to a plurality of charged positions 16' and may be locked in place with locking means 29. Locking such a plurality of magnets in such a position creates a highly powerful charged position 16' and, when the magnets are released from such a position, they produce a large power output as magnets 14' 32 and 33 moves from the charged position to the uncharged positions 17'.

In another embodiment of the invention, the energy storage apparatus may employ only one fixed end magnet instead of a pair of fixed end magnets 11 and 12. For example, first magnet 11 would remain the same but a stop means or block of inert or non-ferrous material, such as rubber, would be substituted for magnet 12. In such a construction, magnet 11 and block 12 should be positioned a distance apart such that the magnetic field of moveable magnet 14 interacts with the magnetic field of magnet 11 along the full length of the axis between the charged and uncharged positions. Similarly, magnet 12 may remain the same and a stop means or block of inert or non-ferrous material, such as rubber, could be substituted for magnet 11. In such a construction, the charged position 16 and the uncharged position 17 would be the same as the attraction forces between moveable magnet 14 and magnet 12 would tend to draw the magnet 14 from position 16 to position 17.

The energy storage apparatus of this invention can be used in many applications but it is believed that one particular application for which the present application is particularly suitable is storing excess energy for electric or solar cars. For example, excess or under utilized rotary motion from the drive train of such a car can be used to rotate input shaft 20 and move magnet 14 to the charged position during operation of the vehicle and/or the energy storage apparatus can also be recharged during periods in which the car is not being used. For example, photovoltaic energy could be turned into mechanical energy and used to rotate input shaft 20 during periods of storage so that that energy may later be used and harnessed during periods of use. The energy that is stored in moveable magnet 14 may then be released and utilized when desired. The present invention also contemplates that a vehicle may use one or more energy storage units. For example, while one unit is in use discharging energy, the other units could be in the process of recharging by connection to the drive train or any other suitable power take-off. That energy may be used to drive the starter when the vehicle is restarted, to power auxiliary components, to provide excess power during periods of peak acceleration, to provide extra torque to the drive train when desired or to provide all the power to run the vehicle. While such uses serve as examples of the usefulness of the present .invention, it will be understood that the present invention may be used with many automotive or other applications.

While in the foregoing, embodiments of the invention have been disclosed in considerable detail for purposes of illustration, it would be understood that many of these details may be varied without departing from the spirit and scope of the invention.

I claim:

1. An energy storage apparatus comprising:
   first and second permanent magnets having north and south poles and being permanently fixed a distance apart along a common longitudinal axis with their respective magnetic fields aligned along said axis, each of said magnets having a like pole facing said distance between said magnets;
   a third permanent magnet having a north and south pole and being movably positioned along said axis between said first and second magnets, said third magnet having its magnetic field aligned along said axis and having a like pole facing one of said fixed magnets and having an opposite pole facing the other of said fixed magnets;
   guide means for positioning said third magnet along said axis and allowing movement of said third magnet along said axis between a charged position in which said like pole is proximal said one of said fixed magnets and an uncharged position in which said opposite pole is proximal said other of said fixed magnets;
   locking means for releasably securing said third magnet in said charged position and allowing selective release of said third magnet; and
   power transmission means for moving said third magnet along said longitudinal axis from said uncharged position to said charged position and harnessing kinetic energy from said third magnet when it is released from said charged position and moves to said uncharged position.

2. The apparatus of claim 1 in which a plurality of power-enhancing permanent magnets are movably positioned along said axis between said third magnet and said one of said fixed magnets, each of said power-enhancing magnets having a magnetic field aligned along said axis and having a north and south pole, said power-enhancing magnets each being positioned with its north and south poles facing like poles of adjacent magnets.

3. The apparatus of claim 1 in which said longitudinal axis is vertical so that gravity acts in a direction generally parallel and coincident with said axis.

4. The apparatus of claim 3 in which said one of said fixed magnets which has a like pole facing said third magnet is positioned at a vertically higher position than that of said other of said fixed magnets.

5. The apparatus of claim 1 in which said power transmission means comprises a transmission box having a rotary input, a rotary output and drive means for transmitting power from to said third magnet, when it moves from said charged position to said uncharged position, to a power shaft connected to said transmission box.

6. The apparatus of claim 5 in which said drive means includes a rack gear permanently attached to said third magnet and a drive shaft having a pinion gear at one end which engages said rack and having a power gear at its opposite end which engages said power shaft of said transmission box.

7. The apparatus of claim 6 in which said locking means comprises a slidable locking member having a distal end adapted to engage said power gear, thereby preventing movement of the power gear as well as said third magnet.

8. An energy storage apparatus comprising:
   a first fixed permanent magnet having a north and south pole and being permanently fixed at one end of a longitudinal axis with its magnetic fields aligned along said axis;
   a moveable permanent magnet having a north and south pole and being movably positioned along said axis between said first magnet and a stop means at the other end of said axis, said third magnet having its magnetic field aligned along said axis and having a like pole facing said first magnet;
   guide means for positioning said third magnet along said axis and allowing movement of said third magnet along said axis between a charged position in which said like pole is proximal said first fixed magnet and an uncharged position in which said first fixed magnet is proximal said stop means;
   locking means for releasably securing said third magnet in said charged position and allowing selective release of said third magnet; and
   power transmission means for moving said third magnet along said longitudinal axis from said uncharged position to said charged position and harnessing kinetic energy from said third magnet when it is released from said charged position and moves to said uncharged position.

9. The apparatus of claim 8 in which a plurality of power-enhancing permanent magnets are movably positioned along said axis between said moveable magnet and said first fixed magnet, each of said power-enhancing magnets having a magnetic field aligned along said axis and having a north and south pole, said power-enhancing magnets each being positioned with its north and south poles facing like poles of adjacent magnets.

10. The apparatus of claim 8 in which said longitudinal axis is vertical so that gravity acts in a direction generally parallel and coincident with said axis.

11. The apparatus of claim 10 in which said said first magnet is positioned at a vertically higher position than that of said moveable magnet.

12. The apparatus of claim 8 in which said power transmission means comprises a transmission box having a rotary input, a rotary output and drive means for transmitting power to and from said moveable magnet, when it moves from said charged position to said uncharged position, to a power shaft connected to said transmission box.

13. The apparatus of claim 12 in which said drive means includes a rack gear permanently attached to said third magnet and a drive shaft having a pinion gear at one end which engages said rack and having a power gear at its opposite end which engages said power shaft of said transmission box.

14. The apparatus of claim 13 in which said locking means comprises a slidable locking member having a distal end adapted to engage said power gear, thereby preventing movement of the power gear as well as said moveable magnet.

15. An energy storage apparatus comprising:
  a first fixed permanent magnet having a north and south pole and being permanently fixed at one end of a longitudinal axis with its magnetic field aligned along said axis;
  a moveable permanent magnet having a north and south pole and being movably positioned along said axis between said first magnet and a stop means at the other end of said axis, said third magnet having its magnetic field aligned along said axis and having an opposite pole facing said fixed magnet;
  guide means for positioning said third magnet along said axis and allowing movement of said third magnet along said axis between a charged position in which said moveable magnet is proximal said stop means and an uncharged position in which said moveable magnet is proximal said fixed magnet;
  locking means for releasably securing said moveable magnet in said charged position and allowing selective release of said moveable magnet; and
  power transmission means for moving said moveable magnet along said longitudinal axis from said uncharged position to said charged position and harnessing kinetic energy from said moveable magnet when it is released from said charged position and moves to said uncharged position.

16. The apparatus of claim 15 in which said longitudinal axis is vertical so that gravity acts in a direction generally parallel and coincident with said axis.

17. The apparatus of claim 16 in which said one of said fixed magnets which has an opposite pole facing said third magnet is positioned at a vertically lower position than that of said moveable magnet.

18. The apparatus of claim 15 in which said power transmission means comprises a transmission box having a rotary input, a rotary output and drive means for transmitting power from to said moveable magnet, when it moves from said charged position to said uncharged position, to a power shaft connected to said transmission box.

19. The apparatus of claim 18 in which said drive means includes a rack gear permanently attached to said moveable magnet and a drive shaft having a pinion gear at one end which engages said rack and having a power gear at its opposite end which engages said power shaft of said transmission box.

20. The apparatus of claim 18 in which said locking means comprises a slidable locking member having a distal end adapted to engage said power gear, thereby preventing movement of the power gear as well as said moveable magnet.

* * * * *